United States Patent
Killo et al.

(10) Patent No.: US 12,490,367 B2
(45) Date of Patent: Dec. 2, 2025

(54) METHOD OF ASSOCIATING WIRELESS CONTROL DEVICES

(71) Applicant: Lutron Technology Company LLC, Coopersburg, PA (US)

(72) Inventors: Jason C. Killo, Emmaus, PA (US); Daniel L Twaddell, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 75 days.

(21) Appl. No.: 17/834,836

(22) Filed: Jun. 7, 2022

(65) Prior Publication Data

US 2022/0312575 A1   Sep. 29, 2022

Related U.S. Application Data

(63) Continuation of application No. 17/101,548, filed on Nov. 23, 2020, now Pat. No. 11,363,703, which is a continuation of application No. 16/679,995, filed on Nov. 11, 2019, now Pat. No. 10,849,211, which is a continuation of application No. 16/207,550, filed on Dec. 3, 2018, now Pat. No. 10,477,656, which is a
(Continued)

(51) Int. Cl.
*G08C 17/02*   (2006.01)
*H05B 47/19*   (2020.01)
*H05B 47/195*  (2020.01)

(52) U.S. Cl.
CPC ............ *H05B 47/19* (2020.01); *G08C 17/02* (2013.01); *H05B 47/195* (2020.01)

(58) Field of Classification Search
None
See application file for complete search history.

(56) References Cited

U.S. PATENT DOCUMENTS

| | | |
|---|---|---|
| 4,864,588 A | 9/1989 | Simpson et al. |
| 5,239,205 A | 8/1993 | Hoffman et al. |
| 5,905,442 A | 5/1999 | Mosebrook et al. |

(Continued)

OTHER PUBLICATIONS

Philips Living Colors Manual—Generation 2 (Led Lamp) Last update Aug. 7, 2009, 33 pgs.
(Continued)

*Primary Examiner* — John F Mortell
(74) *Attorney, Agent, or Firm* — Michael S. Czarnecki; Glen R. Farbanish; Philip N. Smith

(57) ABSTRACT

A first wireless control device may be associated with a second wireless control device in response to the movement of the first wireless control device in relation to the second wireless control device. The second control device may determine whether the signal strength of the wireless signals received from the first wireless control device has changed, and may associate the first wireless control device with the second wireless control device if the signal strength of the received wireless signals has changed. The second control device may be disassociated with the first control device by moving the first wireless control device in relation to the second wireless control device. The second control device may disassociate the first control device when the signal strength of subsequent wireless signals received from the first wireless control device has changed.

21 Claims, 7 Drawing Sheets

Related U.S. Application Data continuation of application No. 14/550,627, filed on Nov. 21, 2014, now Pat. No. 10,149,369.

(60) Provisional application No. 61/907,200, filed on Nov. 21, 2013.

(56) References Cited

U.S. PATENT DOCUMENTS

| | | | |
|---|---|---|---|
| 6,803,728 | B2 | 10/2004 | Balasubramaniam et al. |
| 7,102,502 | B2 | 9/2006 | Autret |
| 7,498,952 | B2 | 3/2009 | Newman, Jr. |
| 7,573,208 | B2 | 8/2009 | Newman, Jr. |
| 7,755,505 | B2 | 7/2010 | Johnson et al. |
| 8,330,638 | B2 | 12/2012 | Altonen et al. |
| 8,508,148 | B1 | 8/2013 | Carley et al. |
| 8,598,978 | B2 | 12/2013 | Knode |
| 10,149,369 | B2 | 12/2018 | Killo et al. |
| 10,477,656 | B2 | 11/2019 | Killo et al. |
| 10,849,211 | B2 | 11/2020 | Killo et al. |
| 2004/0051467 | A1 | 3/2004 | Balasubramaniam et al. |
| 2008/0111491 | A1 | 5/2008 | Spira |
| 2009/0163212 | A1* | 6/2009 | Hall ............ H04W 36/302 455/438 |
| 2011/0115384 | A1 | 5/2011 | Chatelus |
| 2011/0140864 | A1 | 6/2011 | Bucci |
| 2011/0302282 | A1 | 12/2011 | Mahtani et al. |
| 2012/0261078 | A1 | 10/2012 | Adams et al. |
| 2013/0051806 | A1 | 2/2013 | Quilici et al. |
| 2013/0063042 | A1 | 3/2013 | Bora et al. |
| 2014/0001977 | A1 | 1/2014 | Zaharchuk et al. |
| 2014/0015415 | A1 | 1/2014 | Lim et al. |
| 2014/0062309 | A1 | 3/2014 | Kim |
| 2014/0117871 | A1 | 5/2014 | Swatsky et al. |
| 2014/0265568 | A1 | 9/2014 | Crafts et al. |
| 2014/0300276 | A1 | 10/2014 | Wang |
| 2014/0370817 | A1* | 12/2014 | Luna ............ H04W 8/005 455/41.3 |
| 2019/0104601 | A1 | 4/2019 | Killo et al. |

OTHER PUBLICATIONS

Mayrhofer et al., "Shake Well Before Use: Intuitive and Secure Pairing of Mobile Devices", IEEE Transactions on Mobile Computing, vol. 8, No. 6, Jun. 2009, pp. 792-806.

Castelluccia et al., "Shake Them Up!", MobiSys '05: Proceedings of the 3rd international conference on Mobile systems, applications, and services, Jun. 2005, pp. 51-64.

* cited by examiner

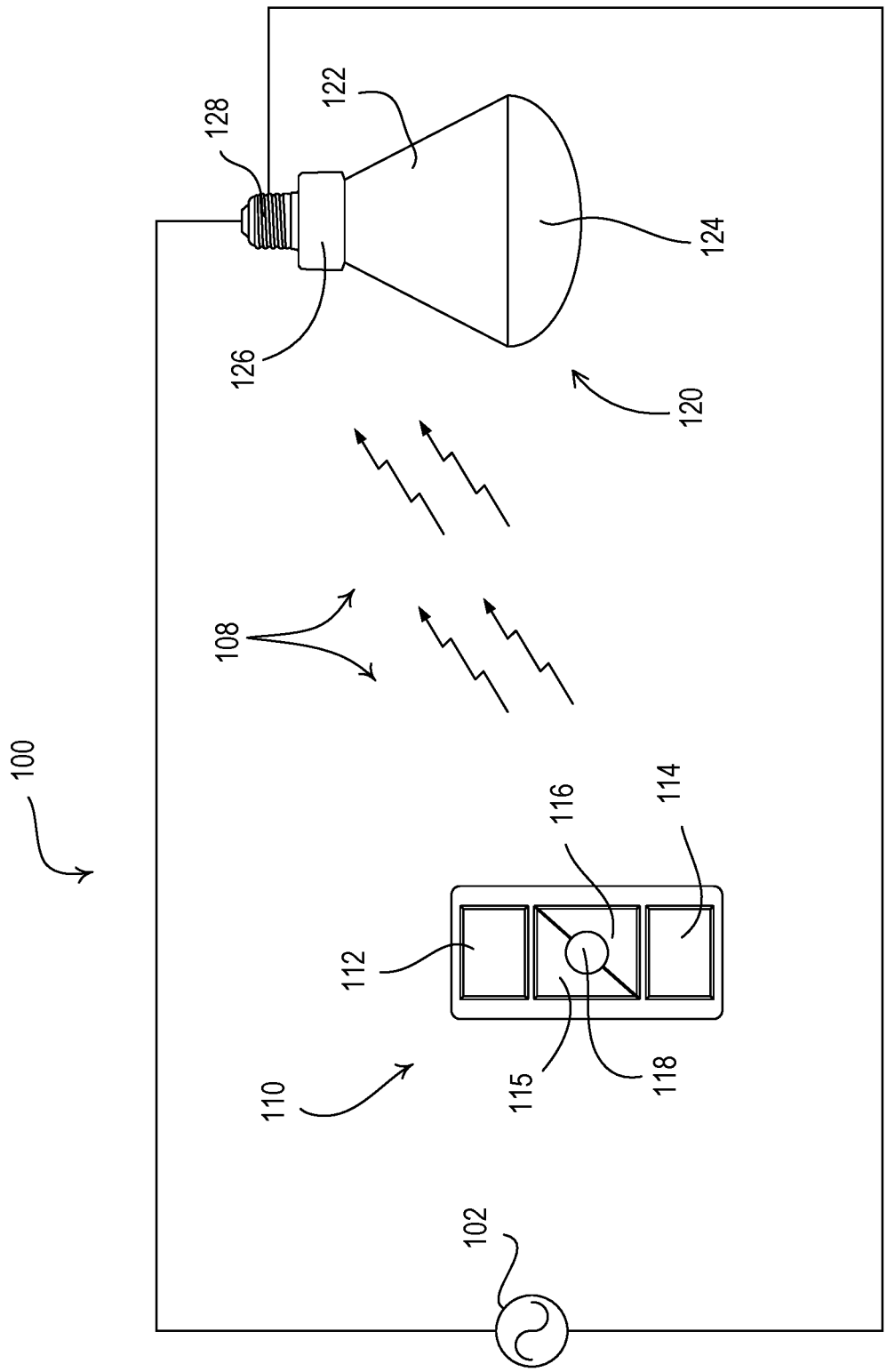

METHOD OF ASSOCIATING WIRELESS CONTROL DEVICES

CROSS-REFERENCE TO RELATED APPLICATIONS

This application is a continuation of U.S. application Ser. No. 17/101,548, filed Nov. 23, 2020; which is a continuation of U.S. application Ser. No. 16/679,995, filed on Nov. 11, 2019 now U.S. Pat. No. 10,849,211, issued Nov. 24, 2020; which is a continuation of U.S. application Ser. No. 16/207,550, filed Dec. 3, 2018 now U.S. Pat. No. 10,477,656, issued Nov. 12, 2019; which is a continuation of U.S. application Ser. No. 14/550,627, filed Nov. 21, 2014 now U.S. Pat. No. 10,149,369, issued Dec. 4, 2018; which claims priority to U.S. Provisional Patent Application No. 61/907,200, filed on Nov. 21, 2013 and entitled "Method of Associating Wireless Control Devices," the entireties of each of which are hereby incorporated by reference.

BACKGROUND

In order to reduce energy consumption, the use of high-efficiency light sources (e.g., gas discharge lamps, such as compact fluorescent lamps (CFL) and light-emitting diode (LED) light sources) is increasing, while the use of low-efficiency light sources (e.g., incandescent lamps or halogen lamps) is decreasing. Particularly, many consumers are replacing older screw-in incandescent lamps with screw-in high-efficiency lamps to provide a quick path to reducing energy consumption. A screw-in high-efficiency lamp includes a light source (e.g., a CFL tube or LED light engine) and an integral load regulation circuit (e.g., a ballast circuit or an LED drive circuit) housed in a base of the high-efficiency lamp. The high-efficiency lamp receives an alternating-current (AC) voltage from an AC power source and the load regulation circuit regulates at least one of a load voltage generated across the light source and a load current conducted through the light source. In most installations, the screw-in high-efficiency lamp may be turned on and off by actuating a light switch coupled between the AC power source and the high-efficiency lamp. Many screw-in high-efficiency lamps may be dimmed by a dimmer switch that replaces the light switch.

Some screw-in high-efficiency lamps now also include integral wireless receivers, e.g., radio-frequency (RF) receivers, for receiving wireless signals, e.g., RF signals, from a remote control device, such that the screw-in high-efficiency may be turned on and off and dimmed in response to the remote control device. In order to control a high-efficiency lamp having an RF receiver, most remote control devices must first be associated with the high-efficiency lamp, such that the high-efficiency lamp is responsive to the wireless signals transmitted by the remote control devices. For example, the high-efficiency lamp may store a unique identifier (e.g., a serial number) of one or more remote control devices and may only respond to wireless signals including the unique identifiers to which the high-efficiency lamp is associated. Many prior art association procedures require actuating buttons on two wireless control devices in order to associate the wireless control devices, as described in U.S. Patent Application Publication No. 2008/0111491, published May 15, 2008, entitled RADIO-FREQUENCY LIGHTING CONTROL SYSTEM, the entire disclosure of which is hereby incorporated by reference. However, most high-efficiency lamps have little space to provide buttons that may be easily assessable to a user. In addition, many high-efficiency lamps may be installed in locations that are not easily assessable to the user to actuate a button on the high-efficiency lamp.

SUMMARY

A load control system may include wireless devices capable of communicating load control instructions between one another for controlling an electrical load, such as a lighting load for example. A control-source device may be a device from which wireless signals (e.g., RF signals) may be transmitted for controlling a control-target device. Wireless control devices may be associated to enable communication between the devices. The association of a wireless control device with other wireless control devices may include storing the unique identifier of the wireless control device in memory at the other devices, such that the source of digital messages received from the wireless control device may be identified at the other devices.

Wireless control devices may be associated based on movements of a wireless control device in relation to another wireless control device. For example, a control-source device may be associated with a control-target device when the control-target device determines that the control-source device is moving in relation to the control-target device. The association movement of the control-source device may include moving the control-source device closer to the control-target device, moving the control-source device further away from the control-target device, rotating the control-source device, moving the control-source device horizontally or vertically, or a compound movement of the control-source device that includes multiple movements. The association movement of the control-source device may be determined based on the received signal strength (RSS) of wireless signals transmitted from the control-source device.

Wireless control devices may be disassociated to disable communication between the devices. The disassociation of a wireless control device with other wireless control devices may include removing the unique identifier of the wireless control device in memory at the other devices, such that the source of digital messages received from the wireless control device may be unidentified or disregarded at the other devices.

Wireless control devices may be disassociated based on movements of a wireless control device in relation to another wireless control device. For example, a control-source device may be disassociated with a control-target device when the control-target device determines that the control-source device is moving in relation to the control-target device. The disassociation movement of the control-source device may include moving the control-source device closer to the control-target device, moving the control-source device further from the control-target device, rotating the control-source device, moving the control-source device horizontally or vertically, or a compound movement of the control-source device that includes multiple movements. The disassociation movement of the control-source device may be determined based on the received signal strength (RSS) of wireless signals transmitted from the control-source device.

Each of the wireless signals transmitted from the control-source device may include an association command or a disassociation command. The association command may be triggered repeatedly at the control-source device by actuating one or more actuators on the control-source device for a period of time. The disassociation command may be triggered repeatedly at the control-target device by actuating one or more actuators on the control-source device for a period of time. The association command and the disassociation command may each be triggered by the same or different actuations on the control-source device.

The control-target device may be included in a group of control-target devices capable of communicating with one another. The control-target devices in each group may communicate association and/or disassociation messages to the other wireless control devices in the group. The control-target devices in each group may communicate a received signal strength of received signals to the other control-target devices in the group to determine whether to associate or disassociate the control-source device from which the signals are received.

The control-source device may be a remote control device. The control-target device may be a load control device, such as a controllable light source, a remotely-located electronic ballast for driving a fluorescent lamp, a remotely-located LED driver for driving an LED light source, a temperature control device (e.g., a thermostat), a motorized window treatment, or another device capable of directly controlling an electrical load.

The foregoing summary provides non-limiting examples that are further described herein. Other features will become apparent from the following description that refers to the accompanying drawings.

BRIEF DESCRIPTION OF THE DRAWINGS

FIG. 1 is a simple diagram of a load control system having a remote control device and a controllable screw-in light source.

DETAILED DESCRIPTION

Figure 2A:
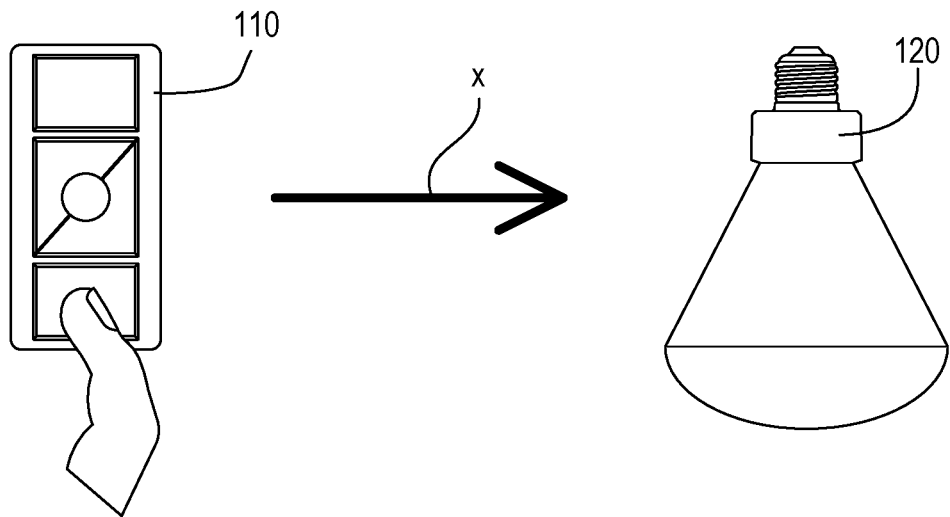
FIG. 2A is a simplified diagram illustrating an example association procedure for two wireless control devices.

The foregoing summary, as well as the following detailed description, may be better understood when read in conjunction with the appended drawings. The drawings are provided for illustration purposes, and are in no way limiting the description herein.

FIG. 1 is a simple diagram of an example load control system 100 having a control-source device (e.g., a battery-powered remote control device 110) and a control-target device (e.g., a controllable light source 120), which may receive power from an alternating-current (AC) power source 102. In some installations, a standard, single pole single throw (SPST) maintained mechanical switch (not shown), e.g., a toggle switch or a light switch, may be coupled in series electrical connection between the AC power source 102 and the controllable light source 120 for disconnecting the controllable light source from the AC power source 102 and thus turning off the controllable light source 120.

The controllable light source 120 may comprise a housing having a reflector portion 122, a front surface 124, and/or an integral lighting load (not shown), such as an incandescent lamp, a halogen lamp, a compact fluorescent lamp, a light-emitting diode (LED) light engine, or other suitable light source. The lighting load may be located inside of the reflector portion 122 of the housing and may be adapted to shine light out of the front surface 124 of the controllable light source 120. The front surface 124 of the controllable light source 120 may be transparent or translucent and may be flat or domed. The controllable light source 120 may comprise an enclosure portion 126 coupled to a screw-in base 128. The screw-in base 128 may be adapted to be screwed into a socket (e.g., a standard Edison socket) such that the controllable light source 120 may be coupled to the AC power source 102. Examples of screw-in luminaires are described in greater detail in commonly-assigned U.S. Pat. No. 8,008,866, issued Aug. 30, 2011, entitled HYBRID LIGHT SOURCE; U.S. Patent Application Publication No. 2012/0286689, published Nov. 15, 2012, entitled DIMMABLE SCREW-IN COMPACT FLUORESCENT LAMP HAVING INTEGRAL ELECTRONIC BALLAST CIRCUIT; and U.S. patent application Ser. No. 13/829,834, filed Mar. 14, 2013, entitled CONTROLLABLE LIGHT SOURCE, the entire disclosures of which are hereby incorporated by reference.

The enclosure portion 126 may house an integral load control circuit (not shown), such as a dimmer circuit, a ballast circuit, or an LED driver circuit, for controlling the intensity of the lighting load between a low-end intensity (e.g., approximately 1%) and a high-end intensity (e.g., approximately 100%). The controllable light source 120 may comprise a microprocessor and/or a wireless communication circuit (e.g., an RF receiver) that may be housed inside the enclosure portion 126, such that the microprocessor may be configured to turn the lighting on and off and/or adjust the intensity of the lighting load in response to wireless signals, e.g., radio-frequency (RF) signals 108 received from the remote control device 110.

The remote control device 110 may comprise a plurality of actuators, e.g., an on button 112, an off button 114, a raise button 115, a lower button 116, and a preset button 118 as shown in FIG. 1. The remote control device 110 may be a handheld remote control. Alternatively, the remote control device 110 may be mounted vertically to a wall or supported on a pedestal to be mounted on a tabletop. The remote control device 110 may comprise a microprocessor, an RF transmitter, and a battery for powering the microprocessor and the RF transmitter. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Pat. No. 7,573,208, issued Aug. 22, 1009, entitled METHOD OF PROGRAMMING A LIGHTING PRESET FROM A RADIO-FREQUENCY REMOTE CONTROL the entire disclosures of which are hereby incorporated by reference.

The remote control device 110 may be a control-source device that may transmit the RF signals 108 to a control-target device, such as the controllable light source 120, for controlling the intensity of the lighting load. The RF signals 108 may include digital messages that may include instructions for controlling the intensity of the lighting load. The transmission of the RF signals 108 may be performed in response to actuations of the buttons 112-118. Digital messages transmitted by the remote control device 110 may include a command and/or identifying information. The identifying information may include a unique identifier (e.g., a serial number) associated with the remote control device 110.

A control-source device may be a control device that is operable to transmit a digital message to a control-target device. A control-target device may be a control device that is operable to receive a digital message from a control-source device. A single control device may be configured to operate as a control-source device and/or a control-target device. Examples of control-source and control-target devices are described in greater detail in commonly-assigned U.S. patent application Ser. No. 13/830,237, filed Mar. 14, 2013, entitled COMMISSIONING LOAD CONTROL SYSTEMS, the entire disclosure of which is hereby incorporated by reference.

The load control system 100 may comprise other types of control-source devices, such as remote occupancy or vacancy sensors (not shown) for detecting occupancy and/or vacancy conditions in the space in which the load control system is installed. The occupancy or vacancy sensors may each transmit digital messages to the controllable light source 120 via the RF signals 108 in response to detecting the occupancy or vacancy conditions. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The control-source devices of the load control system 100 may comprise a remote daylight sensor (not shown) for measuring a total light intensity in the space in which the load control system is installed. The daylight sensor may transmit digital messages including the measured light intensity to the controllable light source 120 via the RF signals 108, such that the controllable light source 120 is operable to control the intensity of the lighting load in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

Figure 2B:
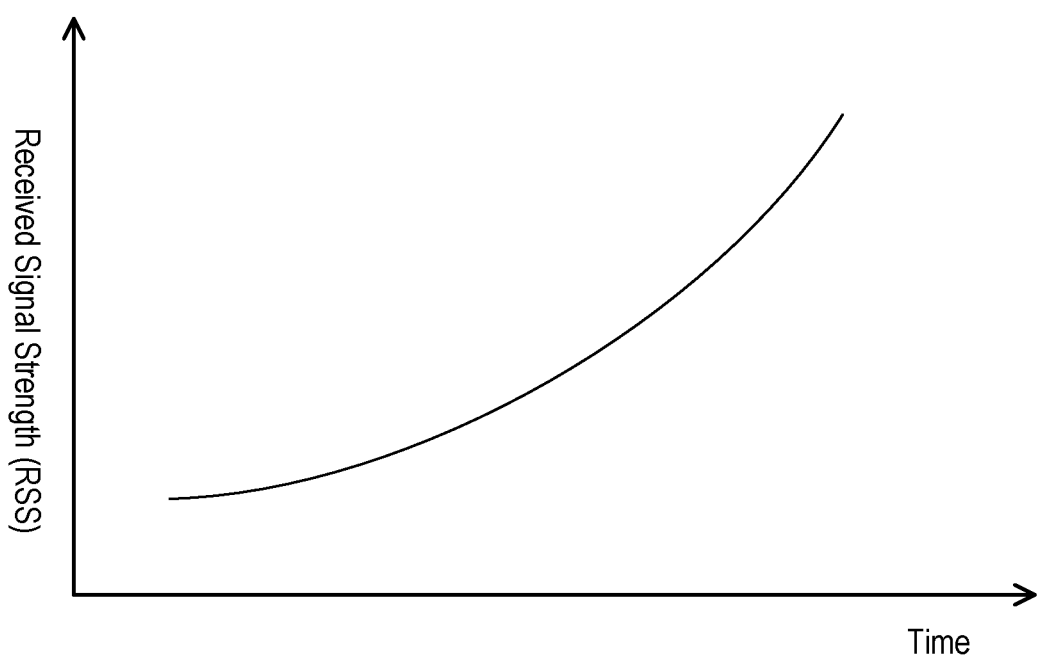
FIG. 2B is a simplified plot of an example of the magnitude of a received signal strength with respect to time at one of the two wireless control devices during the association procedure of FIG. 2A.

During a configuration procedure for configuring the load control system 100, the controllable light source 120 may be associated with the remote control device 110, such that the controllable light source may be responsive to digital messages transmitted by the remote control device. FIGS. 2A and 2B illustrate an example association procedure for the remote control device 110 and the controllable light source 120. For example, to associate the remote control device 110 with the controllable light source 120, the remote control device 110 may be placed into an association mode. The remote control device 110 may be placed into an association mode by pressing and/or holding one or more of the buttons 112-118 for a predetermined amount of time. While the remote control device 110 is in the association mode, the remote control device 110 may be moved toward the controllable light source 120 to associate with the controllable light source 120, as shown in FIG. 2A. The remote control device 110 may translate along a vector x while the remote control device 110 is being moved towards the controllable light source 120.

While in the association mode, the remote control device 110 may repetitively broadcast digital messages having an associate command. The controllable light source 120 may receive a plurality of the repetitively transmitted digital messages. The controllable light source 120 may measure the signal strength of one or more of the received digital messages (e.g., each of the received digital messages). If the controllable light source 120 determines that the signal strength of the received digital messages (e.g., messages including the associate command) is changing with respect to time, the controllable light source 120 may be associated with the remote control device 110.

The controllable light source 120 may be placed into an association mode for receiving association messages from the remote control device 110 or may otherwise recognize the digital messages as association messages (e.g., by an association bit or indicator in the association message). The controllable light source 120 may be placed in association mode by receiving a digital message including the association command from the remote control device 110. The association mode signal may be triggered at the controllable light source 120 by pressing one or more buttons on the remote control device 110 for a predetermined period of time (e.g., one or more buttons that may be different than the buttons for transmitting the digital association messages). The controllable light source 120 may also, or alternatively, be placed in an association mode upon receipt of a power sequence from a power source (e.g., from the power source 102 shown in FIG. 1). For example, the controllable light source 120 may be switched on and off in a predetermined sequence (e.g., on, off, on) to enter the association mode for interpreting association messages from the remote control device 110. The association mode may be programmed in the controllable light source 120 from the remote control device 110 or another computing device. Once the controllable light source 120 is in the association mode, the controllable light source 120 may blink one or more times as an indication to a user.

FIG. 2B is a graph that illustrates an example plot of the received signal strength of digital messages received by the controllable light source 120 as the remote control device 110 moves toward the controllable light source 120 with respect to time. The received signal strength of the digital messages received by the controllable light source 120 may increase non-linearly as shown in FIG. 2B if the remote control device 110 is moved in a linear direction towards the controllable light source at a substantially constant speed. Since the remote control device 110 is being moved at a constant speed, the relationship between the received signal strength of the digital messages received by the controllable light source 120 and the distance from the remote control device 110 to the controllable light source 120 will have a similar shape to the plot shown in FIG. 2B. As the distance between the remote control device 110 and the controllable light source 120 decreases, the received signal strength of the digital messages received by the controllable light source 120 increases as shown in FIG. 2B. When the remote control device 110 is not moving, the received signal strength of digital messages received by the controllable light source 120 may be flat or constant with respect to time.

The controllable light source 120 may be associated with the remote control device 110 once the received signal strength is determined to be increasing over time and/or when the received signal strength increases a predetermined amount over time. The controllable light source 120 may store in memory the serial number of the remote control device 110, which may be included in the digital message having the associate command, to associate itself with the remote control device. After being associated with the remote control device 110, the controllable light source 120 may be responsive to messages including the serial number of the remote control device 110. The remote control device 110 may be associated with the controllable light source 120 by pressing one or more of buttons 112-118 while the remote control device is being moved towards the controllable light source. The remote control device 110 may or may not be placed in an association mode prior to moving the remote control device towards the controllable light source 120.

The remote control device 110 may be associated with the controllable light source 120 by pressing and/or holding one or more of the button 112-118 to place the remote control device in the association mode, and moving the remote control device relative to the controllable light source in a different manner than shown in FIG. 2A (e.g., rather than towards the controllable light source). For example, the remote control device 110 may be rotated or moved vertically or horizontally (e.g., in a plane perpendicular to the vector x shown in FIG. 2A). The specific movement used to associate the remote control device 110 with the controllable light source 120 may be dependent upon the orientation and/or shape of the antennas in the remote control device and/or the controllable light source.

The remote control device 110 may additionally, or alternatively, be associated with the controllable light source 120 in response to a complex or compound movement of the remote control device. The complex or compound movement of the remote control device may include more than one motion. For example, the remote control device 110 may be placed into the association mode and then moved towards and away from the controllable light source 120. Alternatively, the remote control device 110 may be moved towards the controllable light source in two separate movements in quick succession.

The environment in which the remote control device 110 is moving may have an effect on the received signal strength of digital messages received by the controllable light source 120. For example, movements of the hand of a user holding the remote control device 110 and/or objects by which the remote control device is moving may cause fluctuations (e.g., spikes and dips) in the received signal strength with respect to time. The controllable light source 120 may be configured to recognize and/or ignore (e.g., filter out) these fluctuations to appropriately determine if the received signal strength is increasing over time and/or when the signal strength increases a predetermined amount over time.

The RF signals transmitted by the remote control device 110 may be characterized by nodes and antinodes. Since the remote control device 110 is moving with respect to the controllable light source 120 during the association procedure, the nodes and antinodes may cause fluctuations (e.g., spikes and dips) in the received signal strength of digital messages received by the controllable light source 120 with respect to time. The controllable light source 110 may be configured to recognize and/or ignore (e.g., filter out) these fluctuations to appropriately determine if the received signal strength is increasing over time and/or when the signal strength increases a predetermined amount over time. The controllable light source 110 may be able to take advantage of these detected fluctuations, for example, to determine that the remote control device 120 is moving in response to detecting the fluctuations.

Figure 3A:
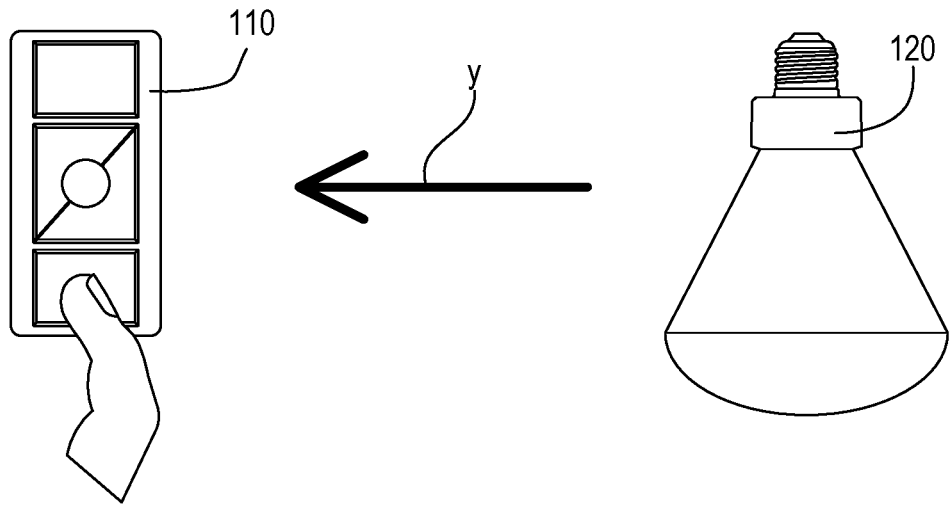
FIG. 3A is a simplified diagram illustrating an example disassociation procedure for two wireless control devices.
Figure 3B:
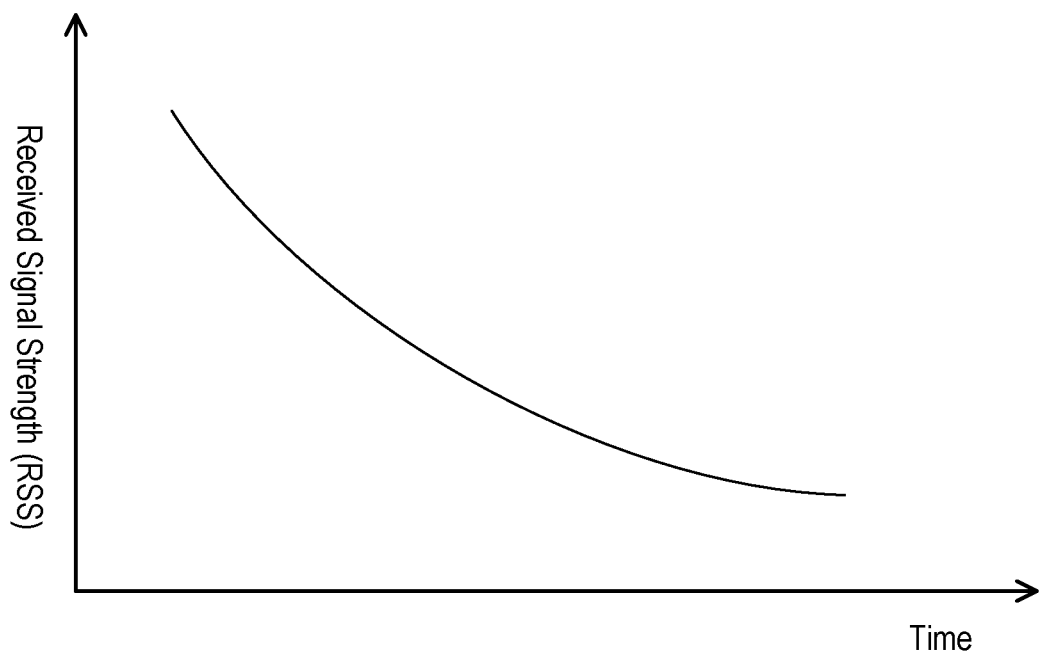
FIG. 3B is a simplified plot of an example of the magnitude of a received signal strength with respect to time at one of the two wireless control devices during the disassociation procedure of FIG. 3A.

The remote control device 110 may also be disassociated with the controllable light source 120, such that the controllable light source 120 is no longer responsive to digital messages transmitted by the remote control device 110. FIGS. 3A and 3B illustrate a disassociation procedure for the remote control device 110 and the controllable light source 120. As shown in FIG. 3A, to disassociate the remote control device 110 from the controllable light source 120, the remote control device 110 may be placed into the association mode (e.g., by pressing and/or holding one or more of the button 112-118 for the predetermined amount of time), and then moved away from the controllable light source 120 while the remote control device 110 is in the association mode. The remote control device 110 may be moved away from controllable light source 120 along a vector y.

If the controllable light source 120 determines that the signal strength of the received digital messages, which may include an associate command, is changing with respect to time, the controllable light source 120 may be disassociated with the remote control device 110. For example, the controllable light source 120 may delete the serial number of the remote control device 110 from memory. Alternatively, the remote control device 110 may be disassociated with the controllable light source 120 by pressing one or more of buttons 112-118 while the remote control device is moved away from the controllable light source (e.g., rather than placing the remote control device in the association mode prior to moving the remote control device away from the controllable light source).

FIG. 3B is a graph that illustrates an example plot of the signal strength of digital messages as the remote control device 110 moves away from the controllable light source 120 with respect to time (e.g., in a linear direction at a constant speed). The controllable light source 120 may be disassociated with the remote control device 110 once the signal strength is determined to be decreasing over time and/or when the signal strength decreases a predetermined amount over time.

The controllable light source 120 may be configured to be disassociated with the remote control device 110 in response to a receiving a disassociate command from the remote control device 110. For example, the remote control device 110 may be placed into a disassociation mode by pressing and/or holding one or more of the buttons 112-118 for a predetermined amount of time. The remote control device 110 may be placed into the disassociation mode by pressing the same or different buttons than those pressed and/or held to cause the remote control device 110 to enter the association mode. After pressing and/or holding one or more of the buttons 112-118 for a predetermined amount of time, remote control device 110 may be moved relative to the controllable light source 120, while the remote control is in the disassociation mode, to disassociate the controllable light source. For example, the remote control device 110 may be moved away from the controllable light source 120, rotated, and/or moved vertically or horizontally. The remote control device 110 may be moved towards (e.g., along the vector x) the remote control device 110 while the remote control device 110 is in the disassociation mode to disassociate the remote control device 110 from the controllable light source 120. While in the disassociation mode, the remote control device 110 may repetitively broadcast digital messages having a disassociate command. If the controllable light source 120 determines that the signal strength of received digital messages, which may include the disassociate command, is changing with respect to time, the controllable light source may be disassociated with the remote control device 110.

The load control system 100 may comprise groups of load control devices that may be associated and/or disassociated with the remote control device 110. For example, the controllable light source 120 may be included in a group of controllable light sources that may communicate with one another via wired or wireless communication (e.g., RF signals). The controllable light source 120 may act as a central node for the group of controllable light sources and may communicate association/disassociation information to other controllable light sources in the group. The controllable light source 120 may determine that the signal strength of received digital messages, which may include an associate command or a disassociate command, from the remote control device 110 is changing with respect to time. The controllable light source 120 may instruct other controllable light sources in the group to associate or disassociate with the remote control device 110 based on the received signal strength (RSS) of the digital messages.

The controllable light source 120 may provide the received signal strength of the digital messages received from the remote control device 110 to the other controllable light sources in the group. The other controllable light sources in the group may use the received signal strength to determine whether the received signal strength of the digital messages received at the controllable light source 120 is changing. The controllable light source 120 may also receive the received signal strength of the digital messages from the other controllable light sources in the group. Based on the received signal strength of the digital messages at the controllable light source 120 and/or the received signal strength of the digital messages received at one or more other controllable light sources in the group, the controllable light source 120 may associate or disassociate with the remote control device 110. If the controllable light source 120 uses the received signal strength of the digital messages at another controllable light source in the group, the controllable light source 120 may determine that even though the controllable light source 120 does not detect a change in the received signal strength of the digital messages received directly from the remote control device 110, the received signal strength of the digital messages may be changing with respect to the location of another controllable light source. If the controllable light source 120 uses the change in received signal strength from one or more other controllable light sources in the group, the controllable light source 120 may be associated or disassociated with the remote control device 110 when a change in received signal strength is detected at a threshold number (e.g., more than one) of controllable light sources in the group.

The group of controllable light sources may be selected by the remote control device 110. The remote control device 110 may indicate in the digital messages a group identifier for the group of controllable light sources to which it is communicating. The remote control device 110 may have a configurable communication range that may allow the communication range to be adjusted (e.g., from a 5 foot radius to a 15 foot radius or vice versa). The remote control device 110 may communicate digital messages to the group of controllable light sources within the communication range. While the groups of load control devices are described as including controllable light sources, the groups may include any other load control devices, such as sensors (e.g., occupancy sensors, vacancy sensors, daylight sensors, shadow sensors, etc.), electronic dimming ballasts, LED drivers, temperature control devices (e.g., a thermostats), motorized window treatments, and/or other load control devices.

The controllable light source 120 may be associated with and/or disassociated with the other devices of the load control system 100 that may include RF transmitters/receivers. For example, the controllable light source 120 may be associated with and/or disassociated with sensors, such as an occupancy sensor, a vacancy sensor, a daylight sensor, a shadow sensor, and/or another type of load control device in a similar manner as the remote control device 110 is associated with and/or disassociated with the controllable light source 120. The remote control device 110 and/or the controllable light source 120 may comprises RF transceivers, such that the devices are able to transmit and/or receive the RF signals 108. The remote control device 110 and/or the controllable light source 120 may operate as control-source devices and/or control-target devices for communicating digital messages to and/or from other RF-capable devices. The remote control device 110 and/or the controllable light source 120 may be part of a larger RF load control system. Examples of RF load control systems are described in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, and U.S. patent application Ser. No. 12/033,223, filed Feb. 19, 2008, entitled COMMUNICATION PROTOCOL FOR A RADIO-FREQUENCY LOAD CONTROL SYSTEM, the entire disclosures of which are both hereby incorporated by reference.

The load control system 100 may comprise other types of control-target devices, such as, for example, remotely-mounted load control devices. The remotely-mounted load control devices may be located on or above the ceiling, inside of a wall, or in an electrical closet. For example, the remotely-mounted load control devices may comprise an electronic dimming ballast for driving one or more fluorescent lamps in a ceiling-mounted lighting fixture and/or an LED driver for regulating the current through an LED light engine in a ceiling-mounted lighting fixture. The electronic ballast or the LED driver may be mounted to, or to a junction box adjacent to, the lighting fixture in which the fluorescent lamps or the LED light engine is located. The electronic ballast and the LED driver may each comprise an internal RF receiver and/or antenna mounted on, or extending from, the respective enclosure.

The electronic ballast and the LED driver may each be electronically coupled to a control module, e.g., via an analog control link or a digital communication link. The control module may comprise a wireless communication circuit (e.g., an RF receiver or an RF transceiver) and may be mounted away from the electronic ballast and the LED driver, for example, on an external surface of the lighting fixture and/or the ceiling. Alternatively, the control module may be mounted above the ceiling, e.g., to the junction box to which the electronic ballast or the LED driver is mounted, inside of a wall, or in an electrical closet. The control module may be configured to control the electronic ballast and the LED driver in response to received RF signals.

The electronic ballast and/or the LED driver may be responsive to the RF signals transmitted by any of the RF transmitters of the load control system 100 (e.g., the battery-powered remote control device 110, an occupancy sensor, a vacancy sensor, and/or a daylight sensor). For example, the electronic ballast and the LED driver may each turn the respective lighting load on and off and/or may each adjust the intensity of the respective lighting load in response to the received RF signals. The RF transmitters of the load control system 100 may be associated with the electronic ballast, the LED driver, and/or the control module, for example, by pressing and/or holding one or more buttons on the RF transmitter for a predetermined amount of time to place the RF transmitter into an association mode, and then moving the RF transmitter toward the one of the electronic ballast, the LED driver, and/or the control module while the RF transmitter is in the association mode (e.g., as shown in FIG. 2A). Examples of electronic dimming ballasts and LED drivers are described in greater detail in commonly-assigned U.S. Patent Application Publication No. 2012/0043900, published Feb. 23, 2012, entitled METHOD AND APPARATUS FOR MEASURING OPERATING CHARACTERISTICS IN A LOAD CONTROL DEVICE, and U.S. Pat. No. 8,492,987, issued Jul. 23, 2013, entitled LOAD CONTROL DEVICE FOR A LIGHT-EMITTING DIODE LIGHT SOURCE, the entire disclosures of which are hereby incorporated by reference.

The load control system 100 may include a temperature control device (e.g., a thermostat) for controlling a heating, ventilation, and air conditioning (HVAC) system. The temperature control device may comprise an internal RF receiver and/or antenna mounted on, or extending from, the enclosure. The temperature control device may be electronically coupled to an RF receiver and/or an antenna that are mounted away from the temperature control device, for example, on an external surface of the wall. The temperature control device may be responsive to the RF signals transmitted by any of the RF transmitters of the load control system 100 (e.g., the battery-powered remote control device 110, an occupancy sensor, a vacancy sensor, and/or a daylight sensor). For example, the temperature control device may adjust the temperature of the load control environment 100 in response to the received RF signals. The RF transmitters of the load control system 100 may be associated with and/or disassociated with the temperature control device as described herein. For example, the RF transmitters of the load control system may be associated with the temperature control device by pressing and/or holding one or more buttons on the RF transmitter for a predetermined amount of time to place the RF transmitter into an association mode, and then moving the RF transmitter toward the temperature control device while the RF transmitter is in the association mode (e.g., as shown in FIG. 2A).

The load control system 100 may comprise motorized window treatments for controlling an amount of daylight entering a space. For example, the motorized window treatments may comprise a battery-powered motorized cellular shade and/or a battery-powered motorized roller shade. The load control system 100 may comprise other types of motorized window treatments, such as, for example, draperies, Roman shades, Venetian blinds, Persian blinds, pleated blinds, and/or tensioned roller shade systems. The motorized window treatments may each comprise an internal RF receiver and/or an antenna mounted on, or extending from, a motor drive unit of the motorized window treatment. The motorized window treatments may each be electronically coupled to an RF receiver and/or an antenna that are mounted away from the motorized window treatment.

The motorized window treatments may be responsive to the RF signals transmitted by any of the RF transmitters of the load control system 100 (e.g., the battery-powered remote control device 110, an occupancy sensor, a vacancy sensor, and/or a daylight sensor). For example, the motorized window treatments may open and close a covering material to allow more or less daylight to enter the space in response to the received RF signals. The RF transmitters of the load control system 100 may be associated with one or more of the motorized window treatments. For example, the RF transmitters may be associated with one or more motorized window treatments by pressing and/or holding one or more buttons on the RF transmitter for a predetermined amount of time to place the RF transmitter into an association mode, and then moving the RF transmitter toward the motorized window treatment while the RF transmitter is in the association mode (e.g., as shown in FIG. 2A). Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. patent application Ser. No. 13/798,946, filed Mar. 13, 2013, entitled BATTERY-POWERED ROLLER SHADE SYSTEM, the entire disclosures of which are hereby incorporated by reference.

Figure 4:
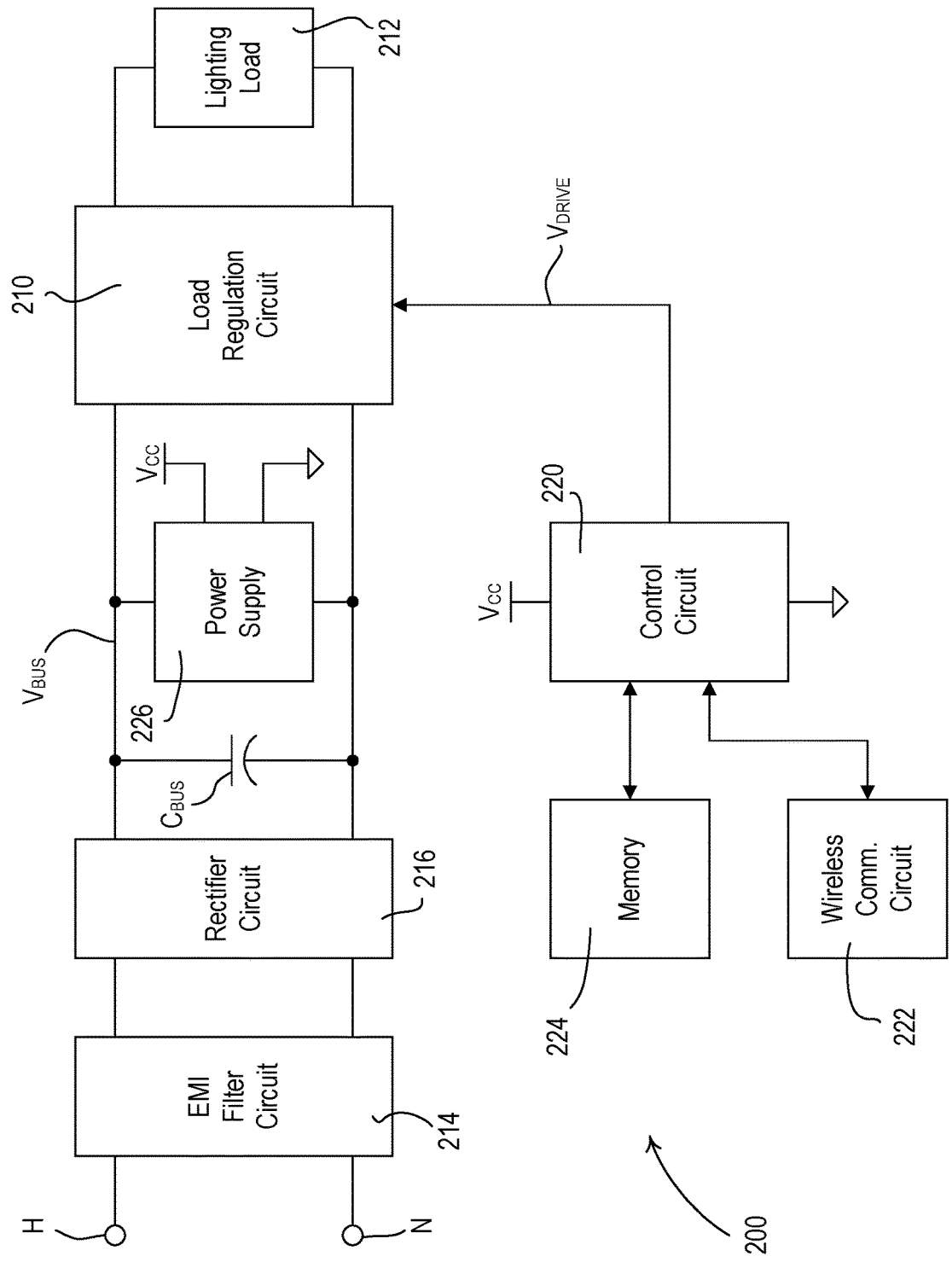
FIG. 4 is a simplified block diagram of an example controllable light source.

FIG. 4 is a simplified block diagram of an example controllable light source 200 that may be deployed as, for example, the controllable light source 120 of the load control system 100 shown in FIG. 1. As shown, the controllable light source 200 may include a hot terminal H and a neutral terminal N that are configured to be electrically coupled to an AC power source, such as the AC power source 102, for example via the screw-in base 128 shown in FIG. 1.

The controllable light source 200 includes an integral lighting load 212 and a load regulation circuit 210 (e.g., a load control circuit) for controlling the intensity of the lighting load 212. The controllable light source 200 may include an electromagnetic interference (EMI) filter 214 that may operate to mitigate (e.g., prevent) noise generated by the load regulation circuit 210 from being conducted on the AC mains wiring. The controllable light source 200 may include a rectifier circuit 216 for generating a direct-current (DC) bus voltage VBUS across a bus capacitor CBUS As shown, the load regulation circuit 210 may receive the bus voltage VBUS and may regulate the power delivered to the lighting load 212 in order to control the intensity of the lighting load. For example, the load regulation circuit 210 for controlling the lighting load 212 may include a dimmer circuit for an incandescent lamp, an electronic ballast circuit for a compact fluorescent lamp (CFL), a light-emitting diode (LED) driver for an LED light engine, or the like.

The controllable light source 200 may include a control circuit 220 operatively coupled to the load regulation circuit 210. The control circuit 220 may operate to control the intensity of the lighting load 212. The control circuit 220 may include one or more of a processor (e.g., a microprocessor), a microcontroller, a programmable logic device (PLD), a field programmable gate array (FPGA), an application specific integrated circuit (ASIC), or any suitable processing device. The controllable light source 200 may include a wireless communication circuit 222, for example, an RF receiver coupled to an antenna for receiving the RF signals 108 from wireless remote control devices, such as the remote control device 110 of the load control system 100 shown in FIG. 1. The wireless communication circuit 222 may include an RF transmitter for transmitting RF signals, an RF transceiver for transmitting and receiving RF signals, or an infrared (IR) receiver for receiving IR signals.

The controllable light source 200 may include a memory 224 communicatively coupled to the control circuit 220. The control circuit 220 may be configured to use the memory 224 for the storage and/or retrieval of, for example, unique identifiers (e.g., serial numbers) of the wireless remote control devices to which the controllable light source 200 may be responsive. The memory 224 may be implemented as an external integrated circuit (IC) or as an internal circuit of the control circuit 220. The controllable light source 200 may include a power supply 226 coupled to the bus voltage VBUS for generating a DC supply voltage Vcc. The supply voltage Vcc may be used to power one or more of the control circuit 220, the wireless communication circuit 222, the memory 224, and/or other low-voltage circuitry of the controllable light source 210.

Figure 5:
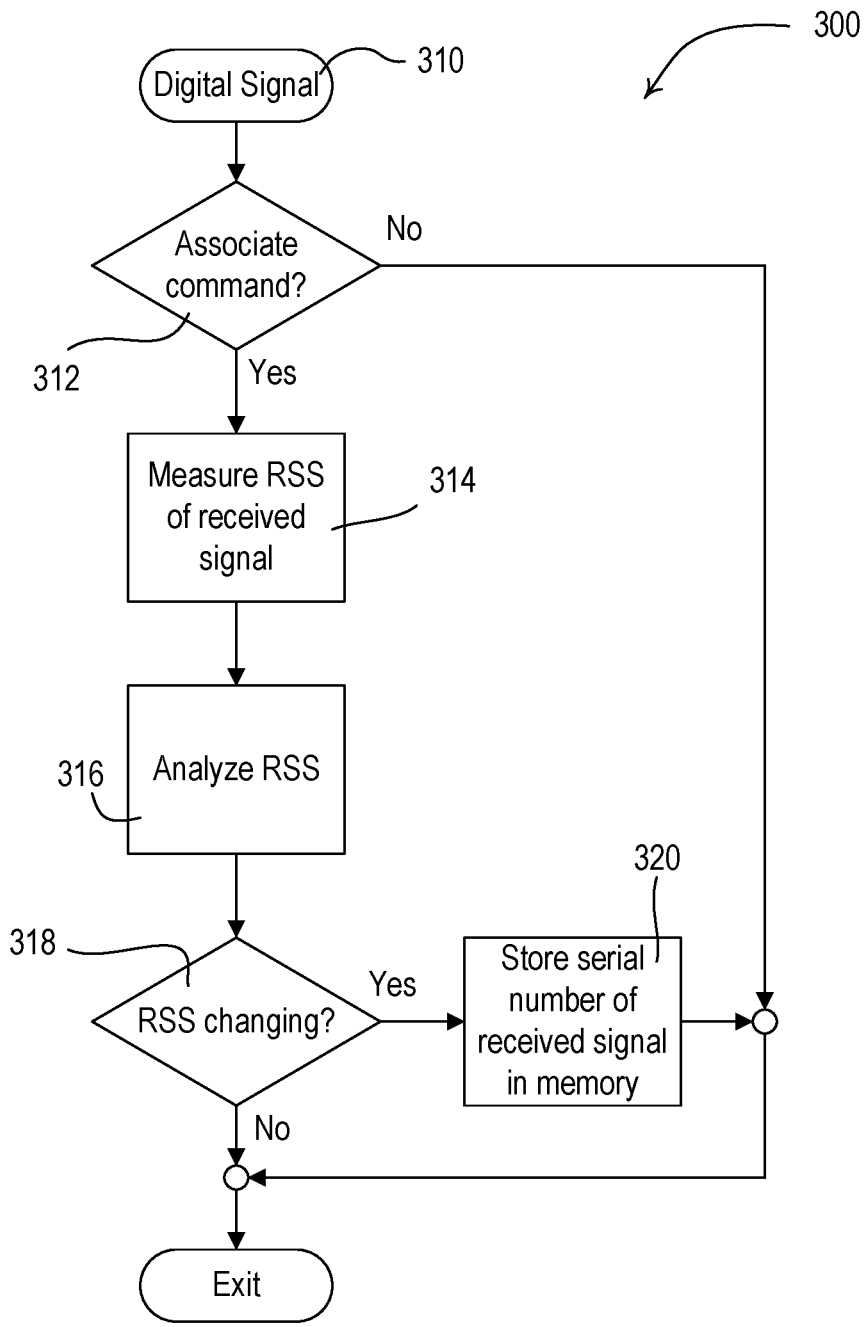
FIG. 5 is a simplified flowchart of an example association procedure for associating a first wireless control device with a second wireless control device.

FIG. 5 is a simplified flowchart of an example association procedure 300 for associating a first wireless control device (e.g., a control-source device) with a second wireless control device (e.g., a control-target device). For example, the association procedure 300 may be executed by the controllable light source 120 to associate the remote control device 110 with the controllable light source 120 of FIG. 1. The association procedure 300 may be executed, for example, when a control circuit of the controllable light source (e.g., the control circuit 220 shown in FIG. 4) receives a digital message via one or more wireless signals (e.g., RF signals) at step 310. If the received digital message includes an associate command at step 312, the control circuit may measure the received signal strength (RSS) of the received wireless signal at step 314. The control circuit may analyze the RSS at step 316. For example, the control circuit may determine a rate ΔRSS at which the RSS is changing at step 316. An example equation for determining the rate ΔRSS is shown below in Equation 1:

$$\Delta RSS = (RSS - RSS_{PREV})/T_{INT}, \quad \text{Equation 1}$$

where $RSS_{PREV}$ is the signal strength of a previously received wireless signal and $T_{INT}$ is the time interval between when the present wireless signal was received and when the previous wireless signal was received. In another example, the control circuit may analyze the signal strengths of consecutively-received wireless signals and perform a least-squares fit at step 316 to determine the slope of the line fit to the points, which may be equal to the rate ΔRSS at which the received signal strength RSS is changing.

At step 318, the control circuit may determine if the signal strength of the received wireless signal has changed since previous wireless signals (e.g., the signal strength of the consecutively-received wireless signals is changing with respective to time). For example, the control circuit may determine if the signal strength of the consecutively-received wireless signals is increasing with respective to time at step 318. The control circuit may compare the rate ΔRSS at which the received signal strength RSS is changing (e.g., as determined at step 316) to a predetermined rate threshold at step 318. The control circuit may analyze the received signal strength RSS of multiple wireless signals to determine if the rate ΔRSS is increasing with respect to time. For example, the control circuit may analyze first, second, and third consecutive wireless signals to determine if a rate $\Delta RSS_{2-3}$ at which the received signal strength RSS changed between the second and third wireless signals is greater than a rate $\Delta RSS_{1-2}$ at which the received signal strength RSS changed between the first and second wireless signals.

If the signal strength of the consecutively-received wireless signals is changing (e.g., getting stronger) at step 318, the control circuit may associate the remote control device from which the wireless signals were received with the controllable light source at step 320, before the association procedure 300 exits. For example, the control circuit may store a serial number from the digital message received via the wireless signals in memory (e.g., the memory 224) at step 320, such that the controllable light source may be responsive to digital messages received from the remote control device 110.

Figure 6:
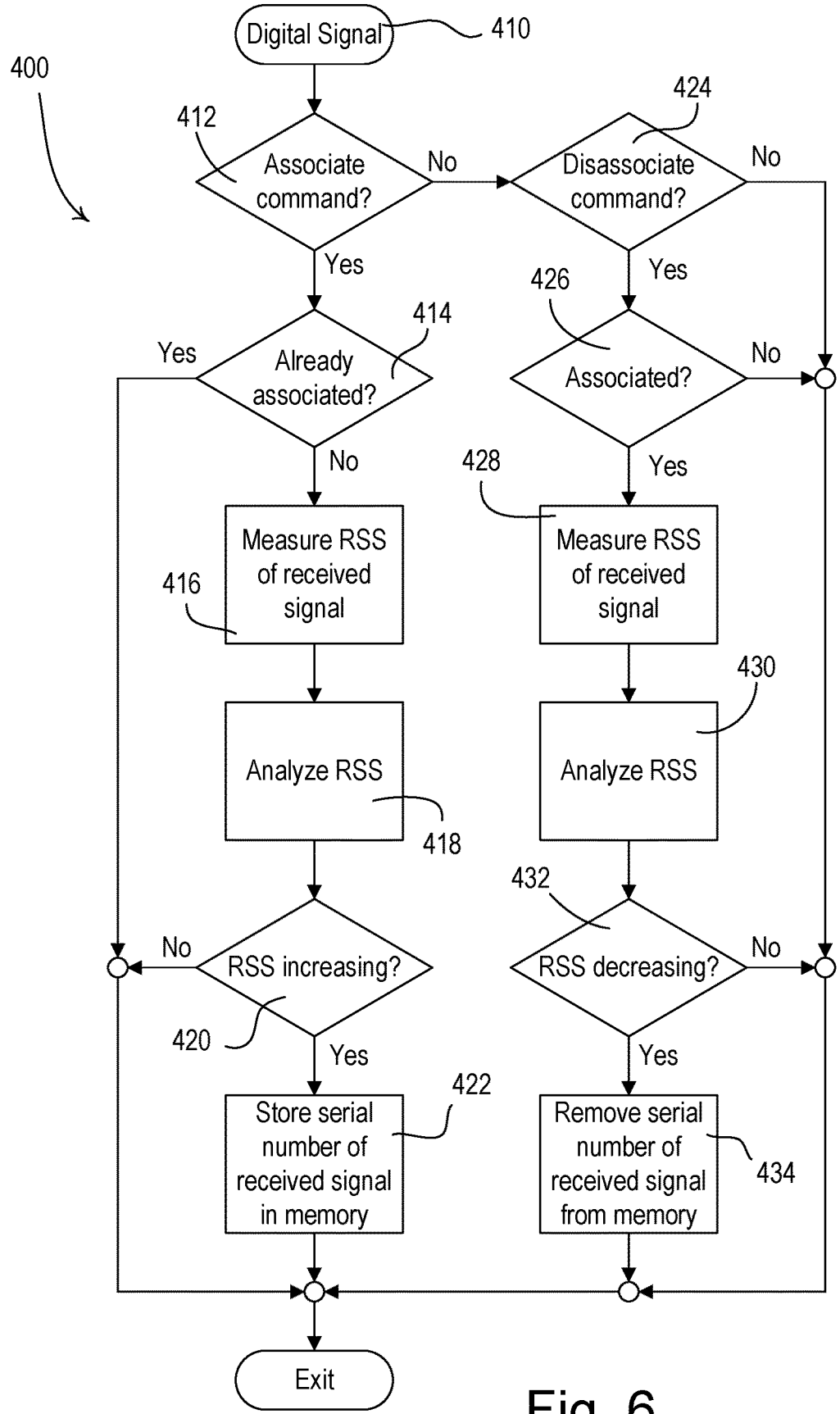
FIG. 6 is a simplified flowchart of an example association/disassociation procedure for associating and/or disassociating a first wireless control device with a second wireless control device.

FIG. 6 is a simplified flowchart of another example association procedure 400 for associating and/or disassociating a first wireless control device with a second wireless control device, e.g., to associate and/or disassociated the remote control device 110 with the controllable light source 120 of FIG. 1. The association procedure 400 may be executed, for example, when a control circuit of the controllable light source (e.g., the control circuit 220 shown in FIG. 4) receives a digital message via one or more wireless signals (e.g., RF signals) at step 410. If the received digital message includes an associate command at step 412, but the remote control device from which the digital message was received is already associated with the controllable light source at step 414, the association procedure 400 may exit. If the remote control device is not already associated with the controllable light source at step 414, the control circuit may measure the received signal strength RSS of the received wireless signal at step 416 and/or analyzes the measured received signal strength RSS at step 418. The measured received signal strength RSS may be analyzed at step 418 as described above in step 316 of the association procedure 300 shown in FIG. 5, for example.

At step 420, the control circuit may determine if the received signal strength RSS of the received wireless signal has increased since previous wireless signals. For example, the control circuit may determines if the signal strength of the consecutively-received wireless signals is increasing with respect to time in a manner similar to step 318 of the association procedure 300 shown in FIG. 5. If the signal strength of the received wireless signals is increasing with respect to time at step 420, the control circuit may associate the remote control device from which the wireless signals were received with the controllable light source at step 422, before the association procedure 400 exits. For example, the control circuit may store a serial number from the digital message received via the wireless signals in memory (e.g., the memory 224) at step 422, such that the controllable light source may be responsive to digital messages received from the remote control device.

If the received digital message does not include an associate command at step 412, but includes a disassociate command at step 424, the control circuit may determine if the controllable light source is associated with the remote control device from which the digital message was received at step 426. If not, the association procedure 400 may exit. If the controllable light source is associated with the remote control device from which the digital message was received at step 426, the control circuit may measure the received signal strength RSS of the received wireless signal at step 428. The control circuit may analyze the measured received signal strength RSS at step 430. If the signal strength of the received wireless signals is decreasing with respect to time at step 432, the control circuit may disassociate the remote control device from which the wireless signals were received with the controllable light source at step 434, before the association procedure 400 exits. For example, the control circuit may delete the serial number of the remote control device from which the digital message was received from memory at step 434, such that the controllable light source may not be responsive to digital messages received from the remote control device.

Figure 7:
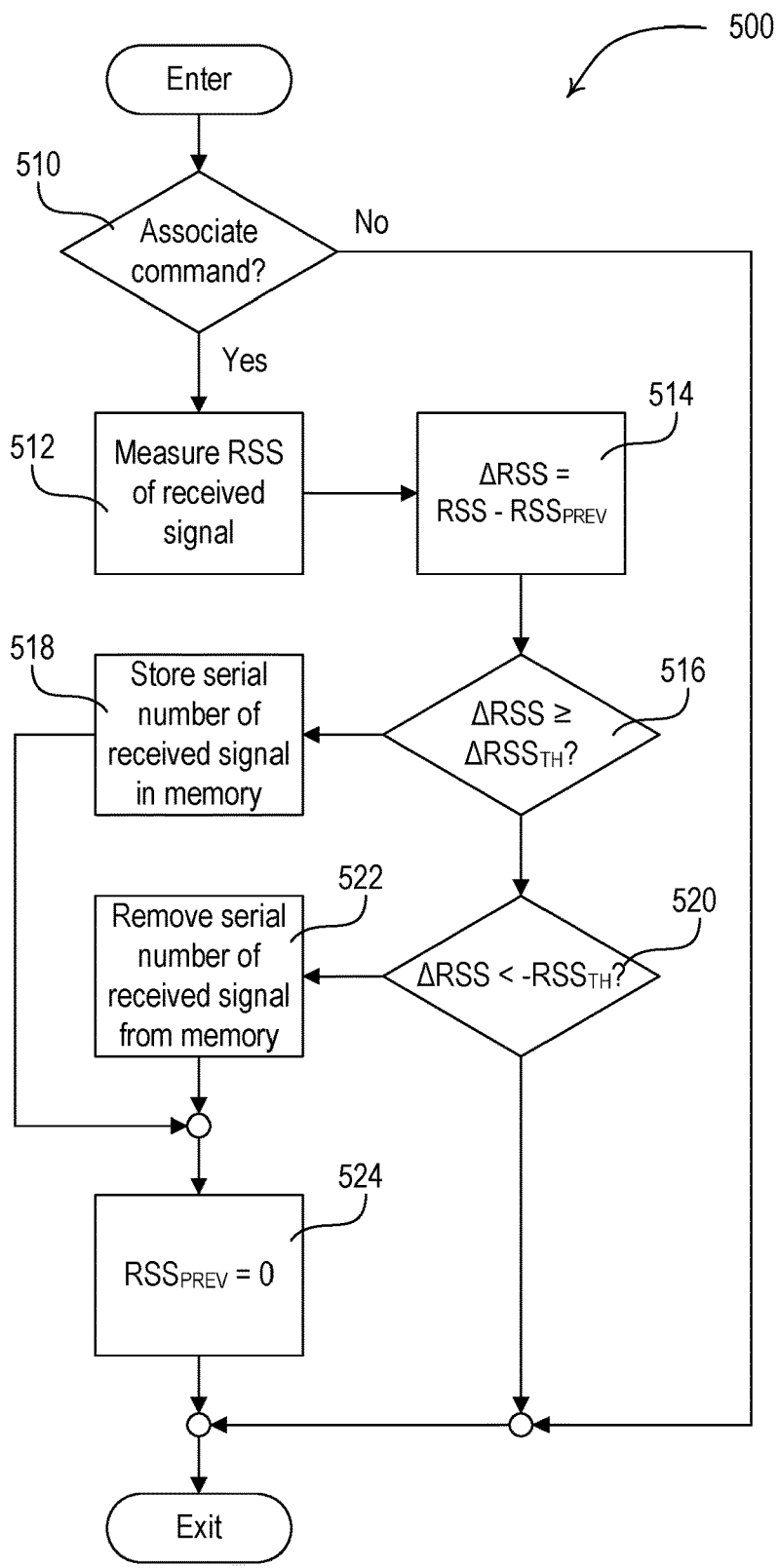
FIG. 7 is a simplified flowchart of another example association/disassociation procedure for associating and/or disassociating a first wireless control device with a second wireless control device.

FIG. 7 is a simplified flowchart of an example association procedure 500 for associating and/or disassociating a first wireless control device (e.g., a control-source device) with a second wireless control device (e.g., a control-target device). The association procedure 500 may be executed, for example, when a control circuit of the controllable light source (e.g., the control circuit 220 shown in FIG. 4) receives a digital message via one or more wireless signals (e.g., RF signals). If the received digital message includes an association command at step 510, the control circuit may measure the received signal strength RSS of the received wireless signal at step 512 to determine whether to associate or disassociated the first wireless control device. If the received digital message does not include an association command at step 510, the association procedure 510 may exit.

The control circuit may analyze the received signal strength RSS at step 514 to determine whether to associate or disassociate the wireless control device from which the signal was received. For example, the control circuit may determine, at 514, a difference in signal strength $\Delta RSS$ between the received signal strength RSS and a previously received signal strength $RSS_{PREV}$ (e.g., received previously in time). If, at 516, the difference in signal strength $\Delta RSS$ is greater than or equal to a predetermined threshold change in signal strength $\Delta RSS_{TH}$, the control circuit may associate the remote control device from which the wireless signals were received with the controllable light source at 518. For example, the control circuit may store a serial number from the digital message received via the wireless signals in memory (e.g., the memory 224) at step 518, such that the controllable light source may be responsive to digital messages received from the remote control device 110. If the difference in signal strength $\Delta RSS$ is determined, at 520, to be less than a negative of the predetermined threshold change in power $\Delta RSS_{TH}$, the control circuit may disassociate the remote control device from which the wireless signals were received from the controllable light source at step 522. For example, the control circuit may remove a serial number in the digital message received via the wireless signals from memory (e.g., the memory 224) at step 522, such that the controllable light source may not be responsive to digital messages received from the remote control device 110.

If the difference in signal strength $\Delta RSS$ is not greater than or equal to the predetermined threshold change in signal strength $\Delta RSS_{TH}$ at 516, or less than a negative of the predetermined threshold change in signal strength $\Delta RSS_{TH}$ at 520, the association procedure 500 may exit. If the control circuit performs association at 518 or disassociation at 522, the previously received signal strength $RSS_{PREV}$ may be reset to a predetermined value (e.g., zero) at 524. The previously received signal strength $RSS_{PREV}$ may be set to zero such that when the previously received signal strength $RSS_{PREV}$ is subtracted from the received signal strength RSS at 514, the difference in signal strength $\Delta RSS$ may be a positive value when the remote control device is moved closer to the controllable light source over time and may be a negative value when the remote control device is moved further away from the controllable light source over time.

While the present application has been described with reference to the remote control device 110 and the controllable light source 120, 200, the method of associating two wireless control devices as described herein may be used to associate any type of control-source and control-target devices. A single wireless control device may comprise a wireless transceiver and may be able to operate as a control-source device and a control-target device. For example, the wireless control devices may comprise input devices, such as, occupancy sensors, vacancy sensors, daylight sensors, radiometers, cloudy-day sensors, temperature sensors, humidity sensors, pressure sensors, smoke detectors, carbon monoxide detectors, air-quality sensors, motion sensors, security sensors, proximity sensors, fixture sensors, partition sensors, keypads, battery-powered remote controls, kinetic or solar-powered remote controls, key fobs, cell phones, smart phones, tablets, personal digital assistants, personal computers, laptops, timeclocks, audio-visual controls, safety devices, power monitoring devices (such as power meters, energy meters, utility submeters, utility rate meters), central control transmitters, residential, commercial, or industrial controllers, or any combination of these input devices.

In addition, one or more of the wireless control devices may comprise a load control device, such as, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

Although embodiments are described herein using particular examples, the examples in no way limit the disclosure herein.

What is claimed is:

1. An electrical control device couplable to an electrical load comprising:
communication interface circuitry;
memory circuitry; and
control circuitry communicatively coupled to the communication interface circuitry and to the memory circuitry, the control circuitry to:
receive a maintained first input for a period of time responsive to a user actuation of an actuatable element disposed on a handheld device for the period of time; and for the duration of the maintained first input:

receive, via the communication interface circuitry, a repeating broadcast signal from the handheld device;

determine a respective signal strength of each received broadcast signal;

determine a rate of change in the received signal strength of the broadcast signal over the period of time;

determine a direction of motion of the handheld device based on the determined rate of change of the received signal strength of the broadcast signal; and perform one of:

store data representative of a new control relationship with the electrical control device in the memory circuitry responsive to the detection of a first defined direction of motion of the handheld device; or remove data representative of an existing control relationship association with the electrical control device from the memory circuitry responsive to the detection of a second defined direction of motion of the handheld device.

2. The electrical control device of claim 1 wherein, to receive the repeating broadcast signal from the handheld device, the control circuitry to further:

receive a repeating broadcast signal that includes a unique identifier associated with the handheld device.

3. The electrical control device of claim 2 wherein, responsive to receipt of the maintained first input, the control circuitry to further:

enter a configuration mode responsive to receipt of the maintained first input.

4. The electrical control device of claim 1 wherein, to detect the first defined direction of motion of the handheld device with respect to the electrical control device, the control circuitry to further:

determine whether a rate of change in the received signal strength of the broadcast signal over the period of time of the maintained first input indicates a movement pattern that corresponds to the first defined direction of motion of the handheld device with respect to the electrical control device.

5. The electrical control device of claim 4 wherein, to determine whether the rate of change in the received signal strength of the repeating broadcast signal over the period of time of the maintained first input indicates the movement pattern that corresponds to the first defined direction of motion of the handheld device with respect to the electrical control device, the control circuitry to further:

determine whether an the rate of change in the received signal strength of the broadcast signal is increasing, indicative of the direction of motion of the handheld device is toward the electrical control device.

6. The electrical control device of claim 1, wherein, to detect the second defined motion of the handheld device with respect to the electrical control device, the control circuitry to further:

determine whether the rate of change in the received signal strength of the broadcast signal over the period of time of the maintained first input corresponds to the second defined direction of motion of the handheld device with respect to the electrical control device.

7. The electrical control device of claim 6 wherein, to determine whether the rate of change in the received signal strength of the broadcast signal over the period of time of the maintained first input corresponds to the second defined direction of motion of the handheld device with respect to the electrical control device, the control circuitry to further:

determine whether the rate of change in the received a decreasing signal strength of the broadcast signal is decreasing, indicative of the direction of motion of the handheld device is away from the electrical control device.

8. An electrical control device configuration method, comprising:

receiving, by control circuitry disposed in the electrical control device, a maintained first input for a period of time responsive to a user actuation of an actuatable element disposed on a handheld device for the period of time; and for the duration of the maintained first input:

receiving, by the control circuitry via communicatively coupled communication interface circuitry, a repeating broadcast signal from a handheld device;

determining, by the control circuitry, a respective signal strength of each received broadcast signal;

determining, by the control circuitry, a rate of change in the received signal strength of the broadcast signal over the period of time;

determining, by the control circuitry, a direction of motion of the handheld device based on the determined rate of change of the received signal strength of the broadcast signal; and performing, by the control circuitry, one of:

causing, by the control circuitry, a storage of data representative of a new control relationship with the electrical control device responsive to the detection of a first defined direction of motion of the handheld device; or causing, by the control circuitry, removal of data representative of an existing control relationship with the electrical control device responsive to the detection of a second defined direction of motion of the handheld device.

9. The method of claim 8 wherein, receiving the repeating broadcast signal from the handheld device, further comprises:

receiving, by the control circuitry via the communication interface circuitry, a repeating broadcast signal that includes a unique identifier associated with the handheld device.

10. The method of claim 9, further comprising:

entering, by the control circuitry, a configuration mode responsive to receipt of the maintained first input.

11. The method of claim 8 wherein detecting the first defined direction of motion of the handheld device with respect to the electrical control device further comprises:

detecting, by the control circuitry, whether the rate of change in the received signal strength of the broadcast signal over the period of time of the maintained first input indicates a movement pattern that corresponds to the first defined direction of motion of the handheld device with respect to the electrical control device.

12. The method of claim 11 wherein determining whether the rate of change in the received signal strength of the broadcast signal over the period of time of the maintained first input indicates the movement pattern that corresponds the first defined direction of motion of the handheld device with respect to the electrical control device further comprises:

determining, by the control circuitry, whether the rate of change in the received signal strength of the broadcast signal over the is increasing, indicative of the direction of motion of the handheld device is toward the electrical control device.

13. The method of claim 8 whereinto detect the second defined motion of the handheld device with respect to the electrical control device further comprises:
   determining, by the control circuitry, whether the rate of change in the received signal strength of the broadcast signal over the period of time of the maintained first input corresponds to the second defined direction of motion of the handheld device with respect to the electrical control device.

14. The method of claim 13 wherein, determining whether the rate of change in the received signal strength of the broadcast signal over the period of time of the maintained first input corresponds to the second defined direction of motion of the handheld device with respect to the electrical control device further comprises:
   determining, by the control circuitry, whether the rate of change in the received signal strength of the broadcast signal is decreasing, indicative of the direction of motion of the handheld device is away from the electrical control device.

15. A non-transitory, machine-readable, storage device that includes instructions that, when executed by control circuitry disposed in an electrical control device couplable to an electrical load device, causes the control circuitry to:
   receive a maintained first input for a period of time responsive to a user actuation of an actuatable element disposed on a handheld device for the period of time; and
   for the duration of the maintained first input:
   receive, via communicatively coupled communication interface circuitry, a repeating broadcast signal from the handheld device;
   determine a respective signal strength of each received broadcast signal;
   determine a rate of change in the received signal strength of the broadcast signal over the period of time;
   determine a direction of motion of the handheld device based on the determined rate of change of the received signal strength of the broadcast signal; and
   perform one of:
   store data representative of a new control relationship with the electrical control device responsive to the detection of a first defined direction of motion of the handheld device; or
   remove data representative of an existing control relationship with the electrical control device responsive to the detection of a second defined direction of motion of the handheld device.

16. The non-transitory, machine-readable, storage device of claim 15 wherein the instructions that cause the control circuitry to receive the repeating broadcast signal from the handheld device, further cause the control circuitry to:
   receive, via the communication interface circuitry, a repeating broadcast signal that includes a unique identifier associated with the handheld device.

17. The non-transitory, machine-readable, storage device of claim 16 wherein the instructions, when executed by the control circuitry further cause the control circuitry to:
   enter a configuration mode responsive to receipt of the maintained first input.

18. The non-transitory, machine-readable, storage device of claim 15 wherein the instructions that cause the control circuitry to detect the first defined direction of motion of the handheld device with respect to the electrical control device further cause the control circuitry to:
   determine whether the rate of change in the received signal strength of the broadcast signal over the period of time of the maintained first input indicates a movement pattern that corresponds to the first defined direction of motion of the
   handheld device with respect to the electrical control device.

19. The non-transitory, machine-readable, storage device of claim 18 wherein the instructions that cause the control circuitry to determine whether the rate of change in the received signal strength of the broadcast signal over the period of time of the maintained first input indicates the movement pattern that corresponds to the first defined direction of motion of the handheld device with respect to the electrical control device further cause the control circuitry to:
   determine whether the rate of change in the received signal strength of the broadcast signal is increasing, indicative of indicates the direction of motion of the handheld device is toward the electrical control device.

20. The non-transitory, machine-readable, storage device of claim 15 wherein the instructions that cause the control circuitry to detect the second defined motion of the handheld device with respect to the electrical control device further cause the control circuitry to:
   determine, whether the rate of change in the received signal strength of the broadcast signal over the period of time of the maintained first input corresponds to the second defined direction of motion of the handheld device with respect to the electrical control device.

21. The non-transitory, machine-readable, storage device of claim 20 wherein the instructions that cause the control circuitry to determine whether the rate of change in the received signal strength of the broadcast signal over the period of time of the maintained first input corresponds to the second defined direction of motion of the handheld device with respect to the electrical control device further cause the control circuitry to:
   determine whether the rate of change in the received signal strength of the broadcast signal is decreasing, indicative of the direction of motion of the handheld device is away from the electrical control device.

* * * * *